(12) United States Patent
Poullos

(10) Patent No.: US 7,661,387 B2
(45) Date of Patent: Feb. 16, 2010

(54) DUAL LASER COATING APPARATUS AND PROCESS

(75) Inventor: Mark Poullos, Grand Prairie, TX (US)

(73) Assignee: Dunfries Investment Limited, Jersey, C.I. (GB)

( * ) Notice: Subject to any disclaimer, the term of this patent is extended or adjusted under 35 U.S.C. 154(b) by 668 days.

(21) Appl. No.: 11/045,070

(22) Filed: Jan. 31, 2005

(65) Prior Publication Data

US 2005/0266168 A1 Dec. 1, 2005

Related U.S. Application Data

(60) Provisional application No. 60/539,980, filed on Jan. 30, 2004.

(51) Int. Cl.
*B05C 11/00* (2006.01)
*B05B 5/00* (2006.01)
*B05C 19/00* (2006.01)

(52) U.S. Cl. .................. 118/667; 118/641; 118/642; 118/308

(58) Field of Classification Search ......... 118/641–643, 118/308, 666, 667, 712, 713; 219/121.66, 219/121.69, 121.76; 427/554–556, 596, 427/597; 264/497; 425/174.4
See application file for complete search history.

(56) References Cited

U.S. PATENT DOCUMENTS

| 3,907,656 | A | | 9/1975 | De Souza et al. |
|---|---|---|---|---|
| 5,306,447 | A | * | 4/1994 | Marcus et al. ............. 264/497 |
| 5,405,660 | A | * | 4/1995 | Psiuk et al. ................. 427/597 |
| 5,409,537 | A | * | 4/1995 | Poullos et al. ............. 118/669 |
| 5,660,746 | A | | 8/1997 | Witanachchi et al. |
| 5,993,554 | A | * | 11/1999 | Keicher et al. ............. 118/641 |
| 6,013,336 | A | * | 1/2000 | Baumgart et al. .......... 427/555 |
| 6,802,812 | B1 | * | 10/2004 | Walker et al. ............. 600/309 |
| 2002/0034594 | A1 | | 3/2002 | Shiveley |
| 2003/0209196 | A1 | | 11/2003 | Edwards et al. |
| 2004/0043156 | A1 | | 3/2004 | Emch |
| 2005/0087522 | A1 | * | 4/2005 | Sun et al. ................ 219/121.71 |

FOREIGN PATENT DOCUMENTS

| WO | WO 91/05885 | 5/1991 |
|---|---|---|
| WO | WO 94/22596 | 10/1994 |

\* cited by examiner

*Primary Examiner*—Yewebdar T Tadesse
(74) *Attorney, Agent, or Firm*—Hoffman, Wasson & Gitler, P.C.

(57) ABSTRACT

An apparatus for applying and fusing a powder coating to substrates of various composition uses two lasers to accurately heat the coating to the optimum temperature. A second laser has less power and heats a smaller area than the first laser. Temperature control is enhanced by the ability to superheterodyne two lasers at separate frequencies. This allows for better absorption of certain materials being fused by the laser. Another common problem associated with laser processing occurs as the polymer heats up. During the heating process the spectral lines are Doppler broadened and slightly shifted. This can affect the absorption of a laser of a fixed wavelength. With the present invention, the optimum laser frequency can be turned to a more optimum frequency for absorption still with sufficient power for fast efficient thermal processing.

8 Claims, 3 Drawing Sheets

DUAL LASER COATING APPARATUS AND PROCESS

This application claims the benefit of provisional application Ser. No. 60/539,980, filed Jan. 30, 2004.

BACKGROUND OF THE INVENTION

Field of Use

This invention relates to the field of use of fluorocarbon coatings applied to various substrates. It particularly pertains to sensitive substrates such as composites and the like. In particular, it relates to a method by which two lasers are utilized together to offer advantages over prior art.

Powder coatings are common to the industry and are typically cured or fused using oven systems. One ubiquitous example is polytetrafluoroethylene (PTFE) coatings on cookware. Other coatings include nylon-12, polyethylene and polyurethane. The coating material is applied to the substrate as a powder and must be heated to a viscous fluid in order to bond to the substrate. The oven systems used to bond the powders to substrates are large, expensive and inefficient. There is no possibility to fine tune the process to optimize the results.

A primary objective of this invention is to exercise precision control over the coating process in order to apply fluoropolymer materials over sensitive substrates and to provide a uniform coating free of pin holes to protect the substrate.

Another objective of this invention is to improve traditional coating techniques with fluoropolymers to improve the integrity and uniformity of laser or thermally cured fluoropolymers.

A further objective of this invention is to accomplish fusing of a melt fluorocarbon over a substrate with considerably lower melt temperatures without harming the substrate.

Another improvement associated with this invention is an obvious increase in surface uniformity.

An additional objective is to utilize efficient means to convey the laser power to the target and fuse the polymer in confined areas. The conveyance of laser power is through standard laser beam tubes designed for $CO_2$ or Infrared lasers or fiber optics for diode and diode pump solid state lasers. Proper positioning of the beam is facilitated through an articulated head system capable of delivering both laser beams through three or more axises.

A still further objective of this invention is to provide a process that utilizes two lasers for more efficiency then can be obtained with one large laser processing the coating on its own.

Another objective is to provide a laser fusion system with real time temperature monitoring within close proximity to the work piece even in tight inaccessible areas giving the operator control and flexibility and requiring fewer and cheaper optics. This is also significant where sensitive substrates are present to reduce the thermal presence of the laser and reduce the risk of damage.

These and other objects of the invention will be be apparent to one of ordinary skill in the art after reading the disclosure of the invention.

SUMMARY OF THE INVENTION

The present invention embodies an apparatus for applying and fusing a powder coating to substrates of various composition.

Temperature control is enhanced by the ability to superheterodyne two lasers at separate frequencies. This allows for better absorption of certain materials being fused by the laser. Another common problem associated with laser processing occurs as the polymer heats up. During the heating process the spectral lines are Doppler broadened and slightly shifted. This can affect the absorption of a laser of a fixed wavelength. With the present invention, the optimum laser frequency can be turned to a more optimum frequency for absorption still with sufficient power for fast efficient thermal processing.

As thicker coatings are applied, especially those above 90 mil inches or 2 mm thick, the coating begins to break down under conditions of thermal stress as experienced in conventional oven systems. In the present invention, these conditions are avoided since the dual laser system fuses these polymers in an absolute minimum time. Therefore, the slow degradation and dissolution of polymers in oven techniques are avoided. Further, the melt flow times with the dual laser system are dramatically reduced compared to a single laser system.

The system utilizes fluoropolymers and other chemical resistant coatings applied to objects such as chemical processing equipment and the like. Further, this invention applies coatings of high melt or processing temperatures over sensitive substrates such as fiberglass, etc. These coatings protect structures and apparatus from virtually any environmental or man-made hazards.

This process utilizes multiple lasers such as, but not limited to $CO_2$ gas lasers, diode lasers or diode pump solid state lasers, to fuse a multitude of various coatings over a substrate.

DETAILED DESCRIPTION OF THE INVENTION

Powdered coatings have a lower melt and upper melt temperatures. At the lower melt temperature, the powder begins to liquefy and flow. At the upper melt temperature, the polymer structure of the coating begins to break down and are rendered useless. The difference between the upper and lower melt temperatures may be small and the difference between the optimum melt flow temperature and polymer dissolution temperature may be as little as two degrees. In the coating process, two lasers may be used. The first laser heats the substrate and coating to the lower melt point and a second, smaller laser having a more absorptive frequency further heats the coating.

Figure 1:
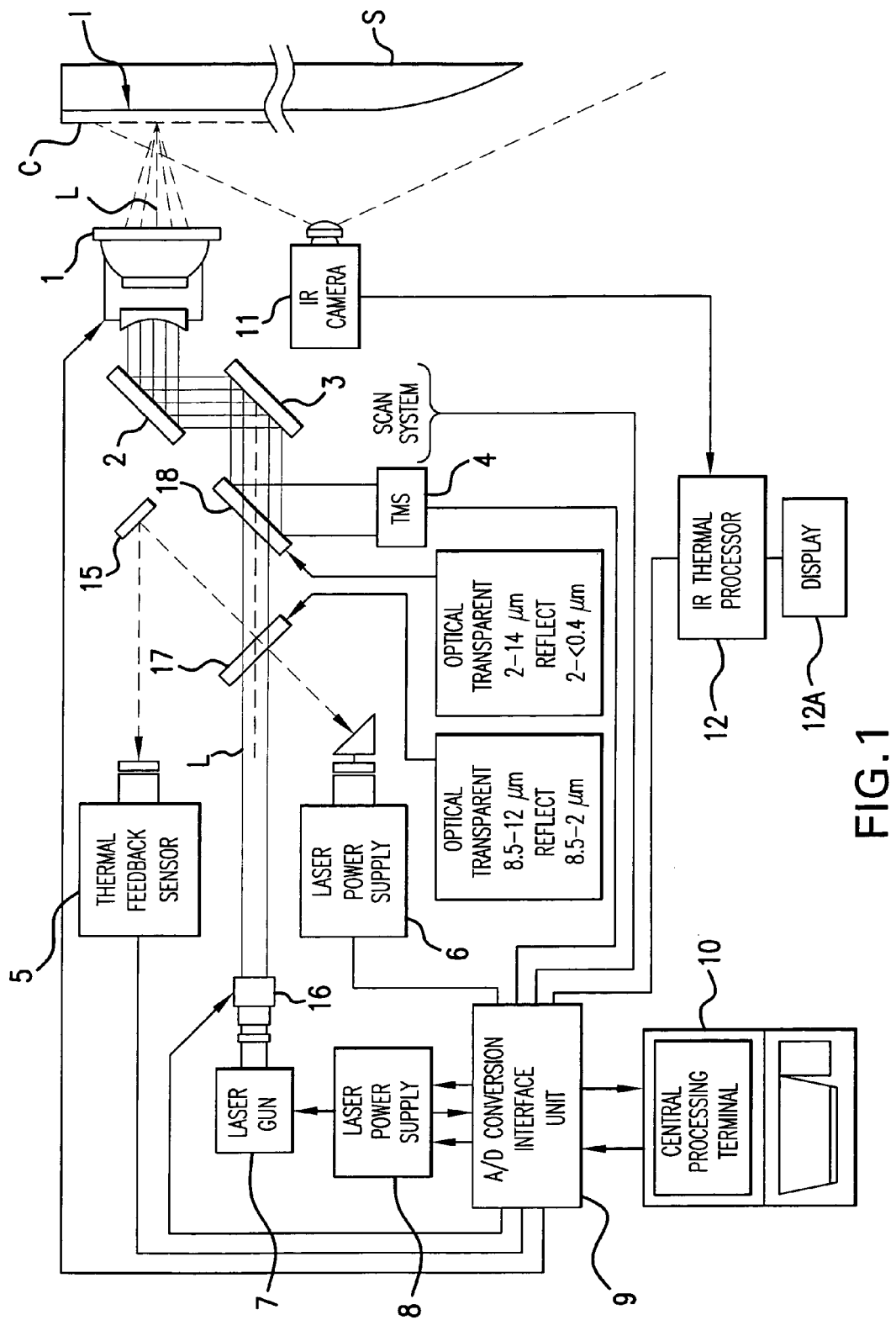
FIG. 1 is a schematic view of a one laser system.

In FIG. 1, a computer 10 controls the process, including the laser power supply 8 to the laser gun 7. A laser beam L emits from the laser head 16 and passes through two dichroic 17,18 before passing galvos 2, 3 and entering head unit 1 after which the laser L is directed at substrate S to melt the coating C. An IR camera 11 attached to an IR thermal processor 12 and display 12A, laser power sensor 6, TMS 4 and thermal feedback sensor 5 using mirror 15 all provide feedback to the computer 10 to optimize the process.

Dual lasers are more efficient for the common practice of modulating laser power to maintain target temperature. As the polymer approaches the upper limit temperature, the laser power must be turned down or modulated to keep from exceeding the upper limit temperature. This modulation occurs rapidly several times per second. This results in lowering the effective output power by duty cycling the laser throughout the coating operation. From past experience, the effective output of the laser is reduced from 40% to 60% depending on the coating being fused. With a single 2000 watt $CO_2$ laser this can be a loss of 800 to 1200 watts. It is obvious that not utilizing full power will significantly destroy the system effectiveness and increase coating times as well as decreasing the cost effectiveness of the system.

The new laser design utilizes two lasers, the second of which is grating tuned to alter principle lazing wavelength (not always desirable to change the second laser from principle wavelength).

Lasers with power exceeding 400 watts continuous cannot generally be grating tuned. This is limited to the maximum power a diffraction grating can withstand.

Figure 2:
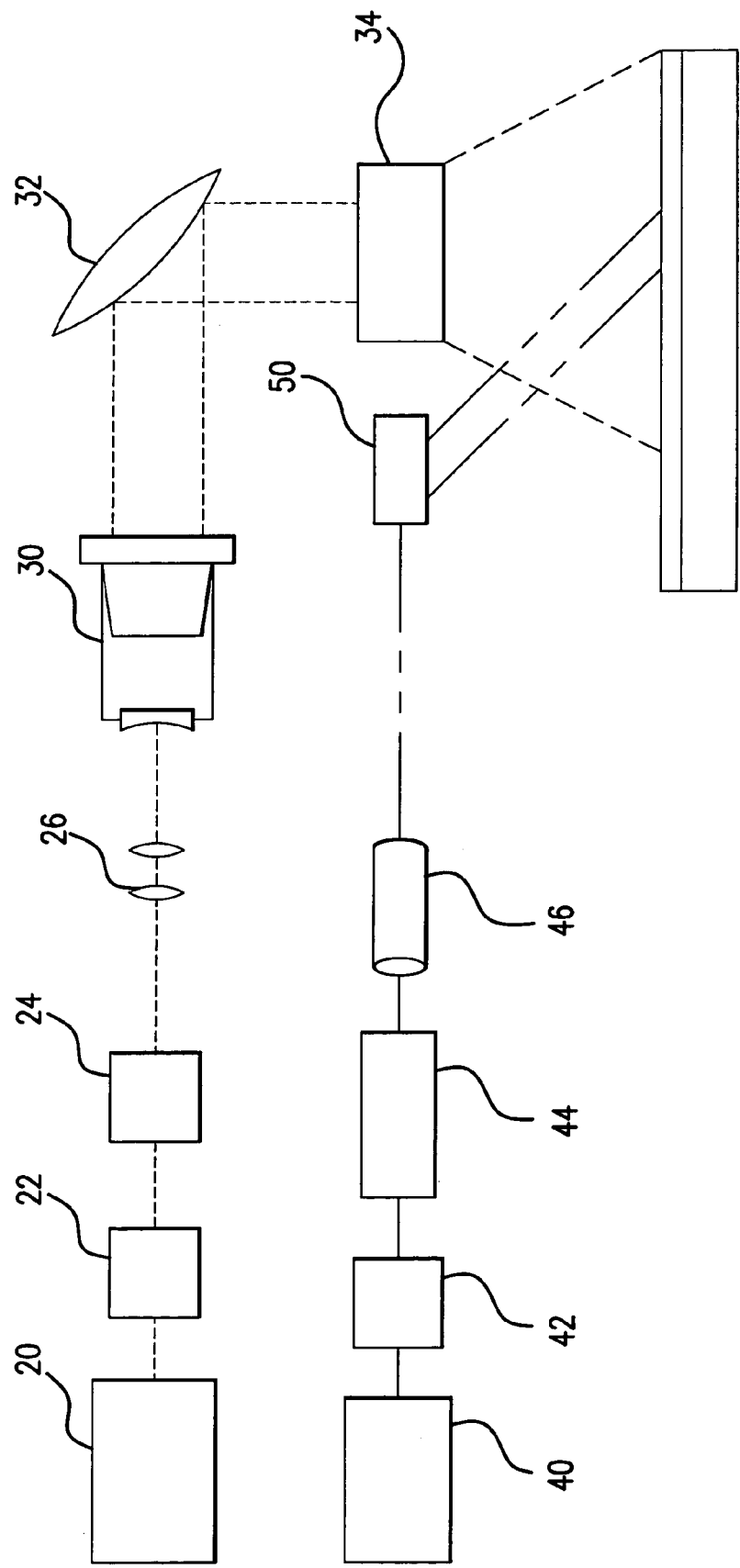
FIG. 2 is a schematic view of a two laser.

The dual laser system shown in FIG. 2 is operated with the most powerful laser 20 at its maximum power. The beam is then passed through a beam integrator 22 where necessary. This produces a beam with a more uniform wave front. After passing through the integrator, the beam passes through a beam condenser 24 and correction optics 26 to produce a more linear parallel beam of approximately 16-18 mm ø diameter and a divergence of 1.2-2.0 mrad (Milli Radians). The beam enters the head unit 30. It is then reflected off a 50 mm steering mirror 32 through a variable expansion beam expander 34. The beam is then expanded to the necessary expansion to produce the correct power density for the high power laser to produce an even power density on the target surface. The maximum expansion is limited by the distance from the target as well as the maximum aperture of the galvo mirrors.

The high power laser power density is set such that the target surface temperature will never exceed the lower melt limit of the polymer being used. For example, using Dupont Teflon PFA's initial melt point of approximately 315° C. and the upper limit point of 348° C. requires an approximate power density of 1 watt per $mM^2$ to reach 315° C. A 2000 watt laser will have its beam expanded to approximately cover a surface of 2000 $mm^2$. The second laser raises the polymer temperature from 315° C. to approximately 342° C.

The second laser 40 in this case is a $CO_2$ laser that is typically sealed, hence does not require a constant gas supply. Further, the second laser is generally RF excited as opposed to DC excited. This allows quicker laser response on the order from a range of 30 milliseconds to 50 milliseconds. The second laser has a beam of approximately 5-8 mm in diameter with a divergence of less than 1.3 mrad. A beam integrator is neither necessary nor desirable. After the beam exits the second laser it enters a beam combiner 42 to align a visible low power with it preferably with a different color/wavelength of the larger laser. This second visible laser facilitates safe alignment as well as proximity detection of the more powerful lasers which are invisible to the naked eye.

The beam enters a beam condenser 44 that is variable to the correct beam size for resolution of the target surface and necessary power density for the material being fused. The beam then enters a beam delivery tube 46 where it is delivered to a articulated head unit 50. Upon entering the head unit 50, the beam enters a small set of galvos then through two correction mirrors which steer the beam to an axial alignment with large laser beam. These beams then pass through an optical window that pass the beams of an approximately wavelength from 8.5 µM to 11.9 µM and reflect the return radiation of approximately 1.0 µM to 5.5 µM for use in detecting temperature of the target surface via a high speed thermal detector. The laser beams, and more specifically the second laser, pass through the large galvo mirrors on the way to the target surface.

The second laser is virtually scanned on the target surface over the large laser beam's footprint. The power of the second laser is then modulated to maintain a temperature at or below the upper limit melt temperature. As in our earlier example of PFA, 342° C. is desirable.

The second laser is the only one for which the power is modulated. While the power loss is approximately the same percentage of loss as with the large laser, 40% to 60%, the total power of the second laser is 200 watts. Hence, the total power lost is 80 to 120 watts verses 720 to 1080 watts with a significant increase in processing speed and temperature resolution.

Processing speed is further enhanced due to the fact that the polymer surface within the footprint of the first laser is constantly held above the minimum melt temperature. Therefore, providing a smoother coating surface with a shorter processing time. This is significant especially with high melt viscosities of fluoropolymers.

One example of the process uses a first high powered diode pump solid state laser of 3 kilowatts at 980 nm and a second diode pump solid state laser having 300 watts at 1064 nm. These lasers meet Mil Spec No. 801 which require a laser dropped from a height of 3 feet onto a cement floor to operate without repair or realignment. The lasers have fiber optic beam delivery resulting in a laser head which is portable. A typical laser head for the second laser is 9.5 inches tall, 11 inches wide and 18 inches long and weighs less than 14 pounds, which is significantly lighter and smaller than a $CO_2$ laser. Both lasers may be sent to a single laser head.

Figure 3:
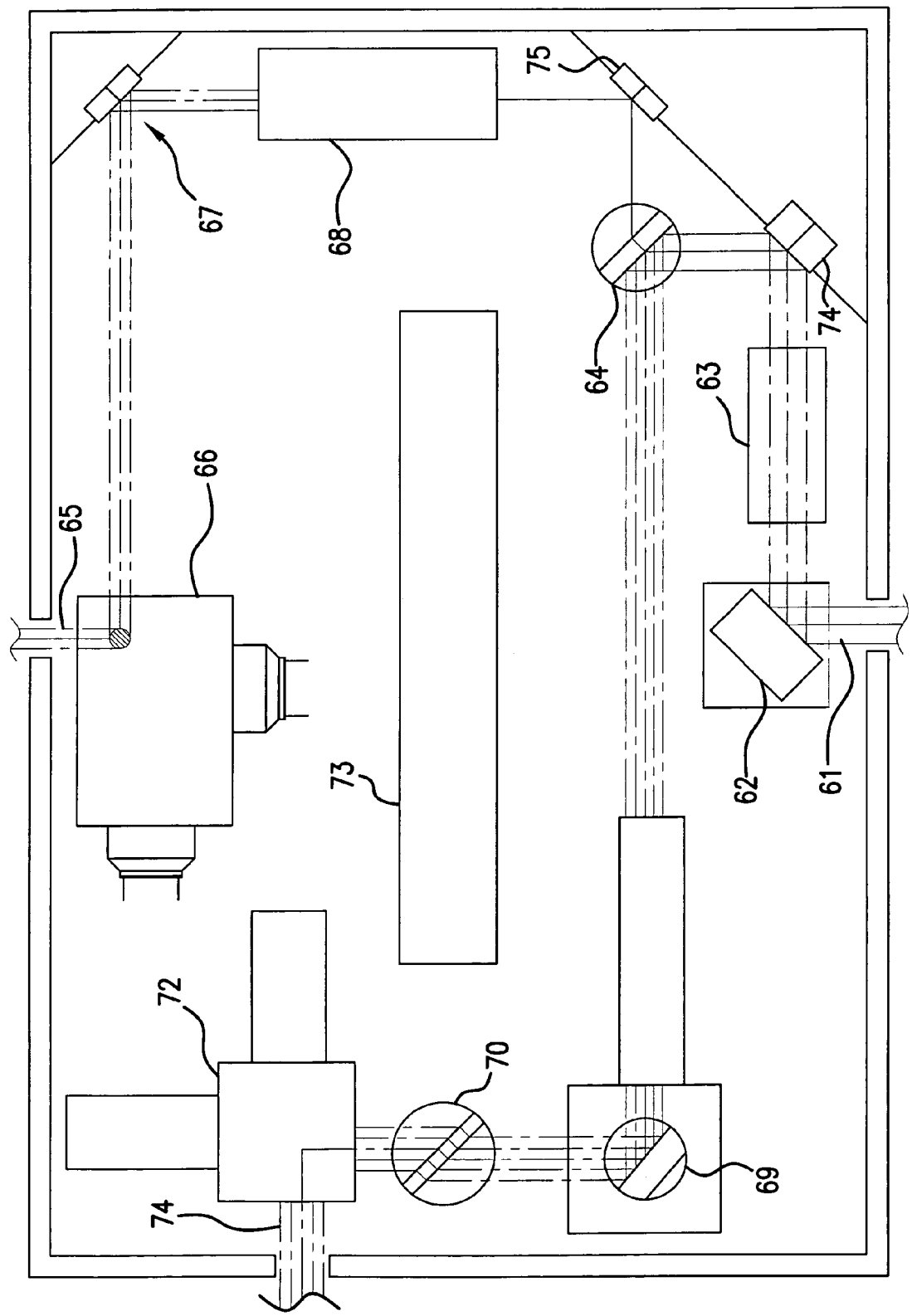
FIG. 3 is a diagram of the control head for combining lasers.

FIG. 3 shows a control head for combining the first and second laser, whether they be CO2, diode lasers or diode pump solid state lasers. The first laser 61 enters the control head and hits optics 62 to direct the laser 61 through a beam expander 63. The laser exits the beam expander and hits mirror 74 towards a first dichroic 64. The second laser enters the control head and rnters a small galvos 66 and exits towards steering mirror 67. The steering mirror causes the second laser to go through a laser polarizer. After the laser polarizer, steering mirror 75 directs the second laser through the first dichroic.

The combined beams are directed by optics 69 towards a second dichroic 70. After passing through the second dichroic, the beams go through a large galvos and exit through exit aperture 74. Radiant energy from the substrate enters through the exit aperture 74 and is directed by the large galvos 72 and second dichroic 70 towards a thermal telescope. The thermal telescope determines the temperature of the substrate and adjusts the lasers accordingly. Both lasers may be adjusted but, in practice, usually only the first laser needs to be adjusted.

As an example, a substrate was first treated with a phosphate compound to increase laser absorption. A PTFE powder coating was applied with an electrostatic spray gun and the laser power was set at 2500 watts and the beam is expanded to achieve a power density of 4 watts per $mm^2$. The metal sheet was moved while the laser remained still. Temperature measures were made to confirm the correct melt temperature with the power density. A second technique is used for coating large immobile structures having a substrate with uneven thickness. The first diode pump solid state laser power was set to 2500 watts and expanded to cover an area of 505 $mm^2$. This results in a power density able to reach the initial melt point of PTFE powder at 318° C.

The second diode pumped solid state laser scans over the area with a 4 mm radius to achieve the upper melt temperature of 342° C. It has been found that this temperature has the best melt flow due to the lowest melt viscosity in a minimum amount of time. The power of the second diode pumped solid state laser is dependent and varied by the thermal feedback system. Adjusting the laser power in real time maintains the upper melt temperature within a range of ±2° C. With this technique, only the second diode pumped solid state laser power is modulated, conserving the larger 3 kilowatt laser for increased processing speed. Also, a high degree of thermal uniformity is achieved due to the smaller footprint of the second laser and the inherently more stable laser.

The first laser is substantially transmissive to the coating layer and substantially adsorptive to the metal substrate maintaining the metal at or above the lower melt temperature in the target area. The metal re-radiates heat energy into the surrounding Teflon® to achieve the lower melt temperature. The second laser is more absorbed by the coating layer itself rather than passing through to the substrate.

The second laser may be employed to control thermal gradient as a steep thermal gradient adversely affects the thermal expansion of the Teflon® coating. Control of the thermal gradient is achieved by overscanning the target area and adjusting or tapering the laser power to achieve a suitable temperature gradient radiating outwardly from the target area.

The result of using two lasers to bond a coating to a substrate is the ability to accurately control the temperature at a optimal level to achieve a uniform coating in a time and energy efficient manner. While the invention has been described with reference to particular embodiments, variations and modifications would be apparent to one of ordinary skill in the art without departing from the scope of the invention.

What is claimed is:

1. An apparatus for coating a substrate with a powdered polymer, comprising:

a first laser producing a high power non-modulated output directed to a first area of the substrate with the powdered polymer provided on the substrate, the substrate provided in an open environment, said first laser heating the powdered polymer to a lower melt temperature;

a second laser producing a modulated power output directed to an area on said substrate smaller than said first area, the modulated power output of said second laser is smaller than the non-modulated power output of said first laser, said second laser heating the powdered polymer to a temperature greater than said lower melt temperature, but lower than an upper melt temperature; and a thermal feedback system, sensing the temperature of the powdered polymer and/or the substrate and wherein the thermal feedback system is configured to modulate only the power of said second laser based upon said upper melt temperature.

2. The apparatus of claim 1, wherein said first laser is a diode pump solid state laser.

3. The apparatus of claim 1, wherein said first laser is a diode laser.

4. The apparatus of claim 1, wherein said second laser is a diode pump solid state laser.

5. The apparatus of claim 1, wherein said second laser is a diode laser.

6. The apparatus in accordance with claim 1, wherein said first and second lasers are superheterodyned at separate frequencies.

7. The apparatus in accordance with claim 1, wherein the substrate is metallic and said first laser is substantially transmissive to the powdered polymer and substantially adsorptive of the metallic substrate.

8. The apparatus in accordance with claim 1, further including a beam expander through which said high power non-modulated output of said first laser passes, thereby producing a laser power density of said first laser set to ensure that said lower melt temperature is never exceeded.

* * * * *